Aug. 29, 1961 J. D. BAER 2,997,917
REINFORCED EYEGLASS FRAME
Filed June 10, 1958

2,997,917
REINFORCED EYEGLASS FRAME

John D. Baer, Attleboro, Mass., assignor to The Bishop Company, North Attleboro, Mass., a corporation of Massachusetts
Filed June 10, 1958, Ser. No. 741,067
3 Claims. (Cl. 88—41)

This invention relates to an eyeglass frame and pertains more specifically to a metal-reinforced plastic eyeglass frame.

While eyeglass frames made of plastic compositions such as zylonite have achieved widespread popularity, they lack sufficient strength and shock resistance for complete acceptance for certain applications where they are subjected to rough usage, as for example in the case of children's eyeglass frames.

One object of the present invention is to provide an eyeglass frame of synthetic plastic composition having a brow bar in which is embedded a unitary metal reinforcing member extending from end to end thereof.

Another object is to provide a plastic eyeglass frame in which an integral, one-piece, reinforcing member is embedded in the brow bar and extends uninterruptedly from end to end thereof, each end of the reinforcing member being secured to a temple hinge.

Still another object is to provide a plastic eyeglass frame having an embedded metal reinforcing member of the type described in which that portion of the plastic brow bar forwardly of the reinforcing member is opaque.

Still a further object is to provide a plastic eyeglass frame having an embedded metallic reinforcement of the type described in which the midportion of the brow bar in which the reinforcing member is embedded is transparent, while the portions of the brow bar forwardly and rearwardly of the reinforcing member are opaque to render the reinforcing member visible only from the top face of the frame.

Another object is to provide a child's eyeglass frame having the outward appearance of plastic when worn but having improved strength and shock resistance.

Other and further objects will be apparent from the drawings and from the description which follows.

Figure 1:
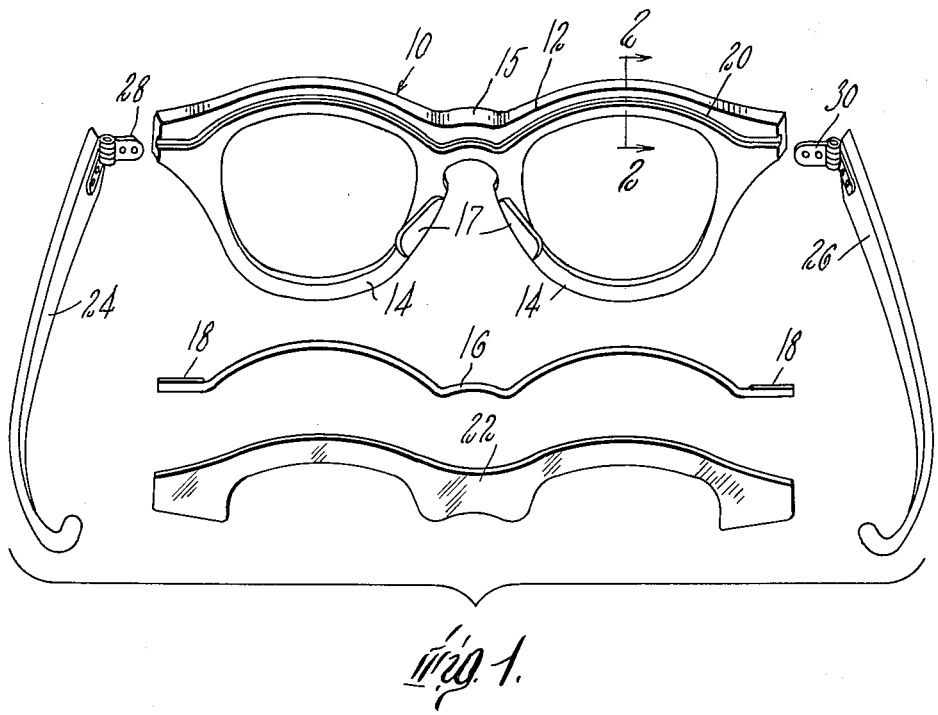
FIG. 1 is an isometric view showing the several parts of one embodiment of an eyeglass frame of the present invention prior to assembly.
Figure 2:
FIG. 2 is a view in cross section taken along line 2—2 of FIG. 1.

As appears from the drawing, in the embodiment shown the principal elements of construction are a unitary, one-piece, die-cut frame 10 of plastic composition such as zylonite. Frame 10 includes both a brow bar 12 extending from one temple portion to the other and lens rims 14, 14 integral therewith. Bridge member 15, which is a part of brow bar 12, connects lens rims 14, 14 adjacent their tops. Nose pads 17, 17 may be provided integral with the lens rims, or they may be formed separately and secured to the frame member by a suitable adhesive or by heat-sealing or fusing the elements together. Frame 10 may be of laminated construction if desired, being plied up from two or more sheets of plastic composition of varying colors, if desired. Such a laminated construction is unitary and integral for the purpose of the present invention.

A unitary, one-piece, metal reinforcing member 16 is provided having a generally circular cross-sectional configuration throughout its extent and carrying flattened end zones 18, 18 which are of rectangular cross-sectional configuration. Reinforcing member 16 is bent as shown in FIG. 1 to conform to the general outline of brow bar 12 and mates with a groove 20 milled in the rear face of brow bar 12.

A separate element 22 of plastic composition having an outline corresponding to that of brow bar 12 is provided, the two temples 24, 26 which may contain conventional metallic reinforcement embedded thereon and which have temple hinges 28, 30 secured to their forward ends completing the array of parts.

Figure 3:
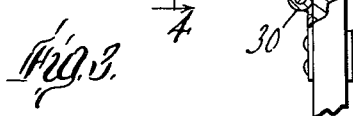
FIG. 3 is a top plan view, partly broken away and in section, on an enlarged scale, showing a portion of the embodiment of FIG. 1 in assembled condition.
Figure 4:
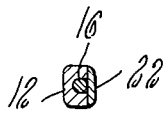
FIG. 4 is a view in cross section taken along line 4—4 of FIG. 3.

The several parts are assembled as shown in FIGS. 3 and 4, element 22 being heat-sealed or bonded in any other desired manner to the rear face of the brow bar overlying metal reinforcement 16 so that the latter is embedded in the finished brow bar. Conventional rivets 32 are employed to secure each of the temple hinges 28, 30 to the metal reinforcing member and to the flattened end portions 18, 18 of metal reinforcing member 16, as best appears in FIG. 3. The corners and edges of the frame may be smoothly rounded off and bridge portion 15 may be curved as shown in FIG. 3 either simultaneously with the bonding of member 22 to the rear face of brow bar 12 or in a separate step if desired.

In a preferred embodiment of the invention, the portion of brow bar 12 disposed forwardly of reinforcing member 16 is opaque at least through a portion of its thickness in order to conceal the reinforcing member from observation when the glasses are being worn. The midportion or central layer of brow bar 12, that is, the portion in which reinforcing member 16 is embedded, is preferably transparent, at least in the zone above the reinforcing member, while plastic element 22 which is employed to cover the rear face of brow bar 12 and reinforcing member 16 is preferably opaque. Consequently, although a purchaser may assure himself of the presence of the metallic reinforcing member by examining the top face of the frame through which the reinforcing member is visible, it is concealed from the view of a casual observer when the glasses are in use. In order to achieve this result, brow bar 12 may be of laminated construction, the forward layer being opaque, the next layer, in which reinforcing member 16 is embedded, being transparent, and element 22 being opaque.

It will be appreciated that the metal reinforcing member, extending as it does from end to end of the brow bar and being rigidly secured to the temple hinges at each end, serves to provide a unitary, one-piece, reinforcing member which conforms to the shape of the brow bar and protects the latter against breakage when subjected to stresses far in excess of those which the unreinforced brow bar is capable of withstanding.

Although specific embodiments of the invention have been described herein, it is not intended to limit the invention solely thereto, but to include all of the obvious variations and modifications within the spirit and scope of the appended claims.

What is claimed is:

1. An eyeglass frame comprising a unitary integral synthetic plastic member including both a brow bar and a pair of lens rims depending therefrom, an elongated one-piece metallic reinforcing member shaped to conform to the longitudinal shape of said brow bar and embedded therein extending uninterruptedly across the bridge portion thereof and above both said lens rims, a synthetic plastic member bonded to said brow bar to cover said reinforcing member, said lens rims being composed of synthetic plastic material and being free from metallic reinforcement, a temple hinge plate secured to each end portion of said plastic brow bar and said reinforcing member, a temple secured to each hinge plate, and means extending through the end portion of said plastic brow bar and said reinforcing member for securing each hinge plate to said plastic brow bar and to said reinforcing member.

2. An eyeglass frame as defined in claim 1 in which the plastic composition of said brow bar forwardly and rearwardly of said reinforcing member is opaque.

3. An eyeglass frame as defined in claim 2 in which the plastic composition of said brow bar above said reinforcing member is transparent to render said reinforcing member visible only from the top face of the frame.

References Cited in the file of this patent

UNITED STATES PATENTS

| | | |
|---|---|---|
| 2,108,667 | Harris | Feb. 15, 1938 |
| 2,357,267 | Rohrback | Aug. 29, 1944 |
| 2,609,278 | Eyles | Sept. 2, 1952 |
| 2,755,705 | Stegeman | July 24, 1956 |
| 2,849,917 | Petri | Sept. 2, 1958 |

FOREIGN PATENTS

| | | |
|---|---|---|
| 557,481 | Great Britain | Nov. 23, 1943 |
| 695,247 | Great Britain | Aug. 5, 1953 |
| 747,235 | Great Britain | Mar. 28, 1956 |